O. T. BELCHER.
AEROPLANE CONSTRUCTION.
APPLICATION FILED JULY 16, 1921.

1,438,686.

Patented Dec. 12, 1922.
5 SHEETS—SHEET 1.

Osmond Theron Belcher
Inventor

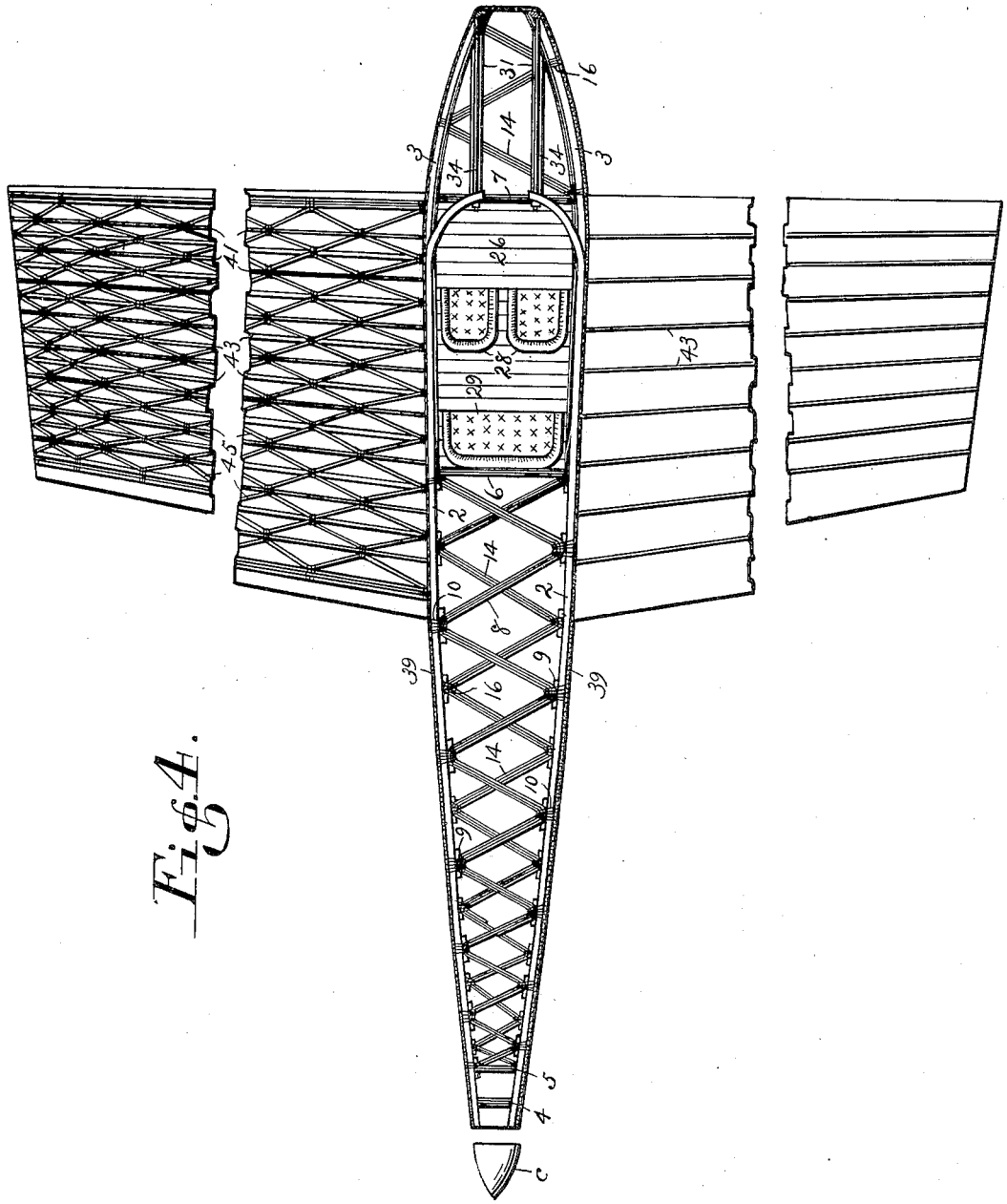

O. T. BELCHER.
AEROPLANE CONSTRUCTION.
APPLICATION FILED JULY 16, 1921.
1,438,686.
Patented Dec. 12, 1922.
5 SHEETS—SHEET 4.
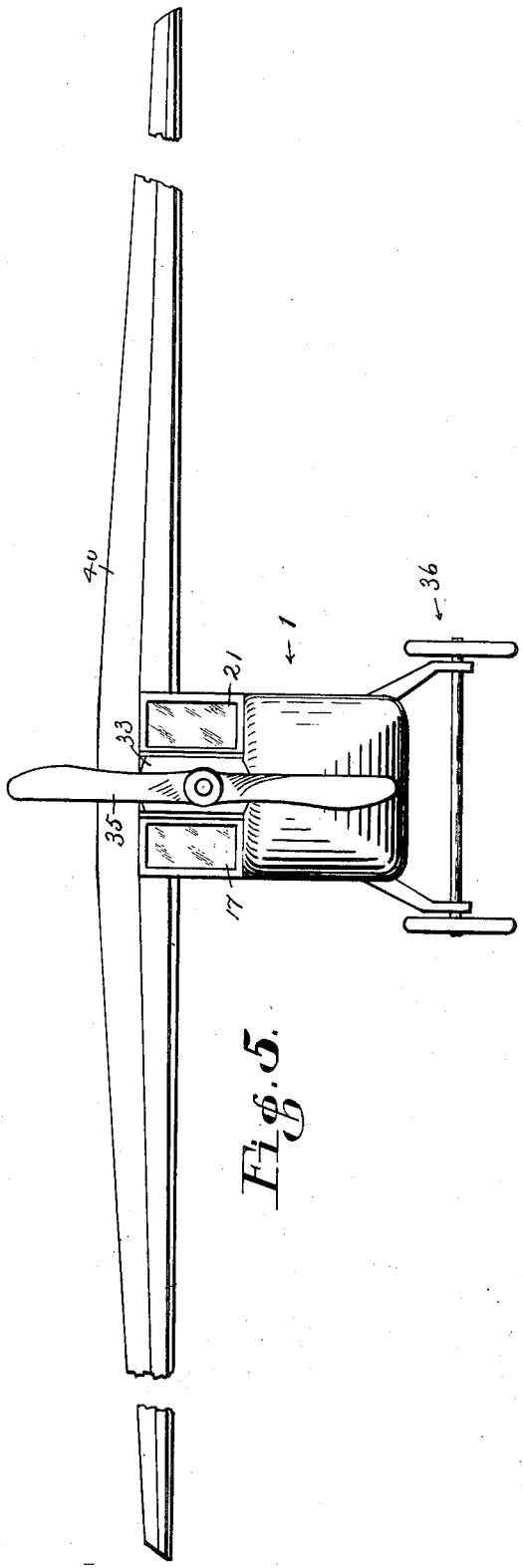
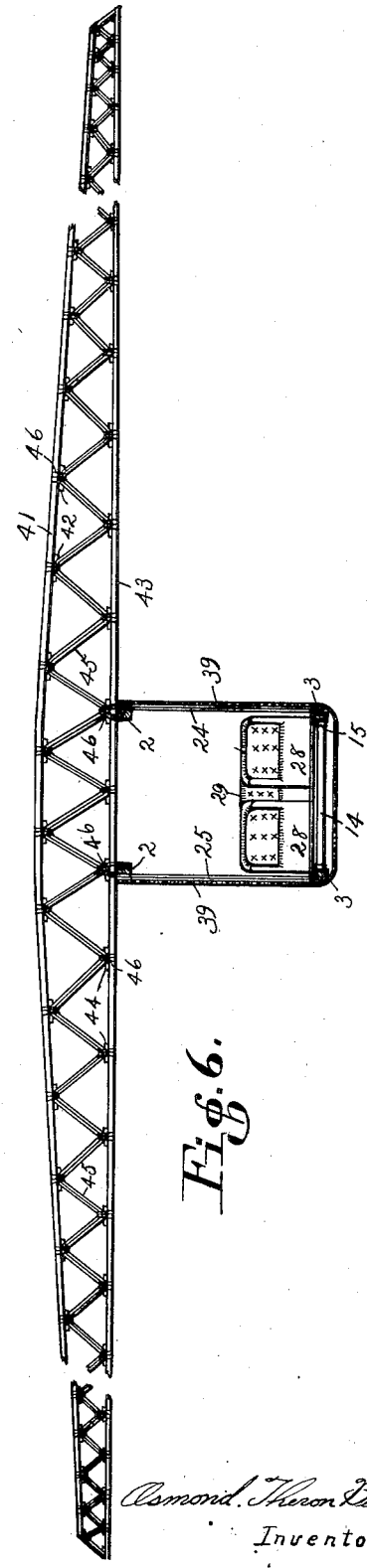
Osmond Theron Belcher
Inventor O. I. BELCHER.
AEROPLANE CONSTRUCTION.
APPLICATION FILED JULY 16, 1921.
1,438,686.
Patented Dec. 12, 1922.
5 SHEETS—SHEET 5.
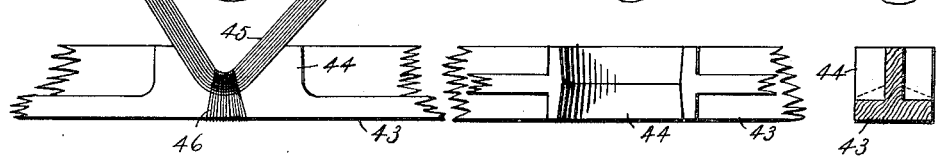
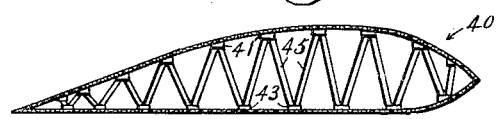
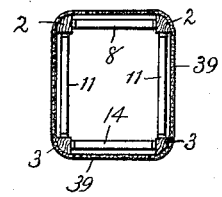
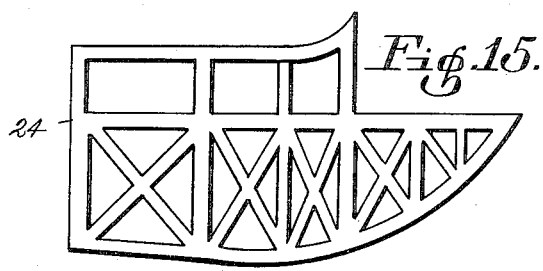
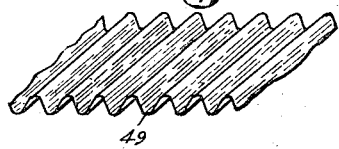
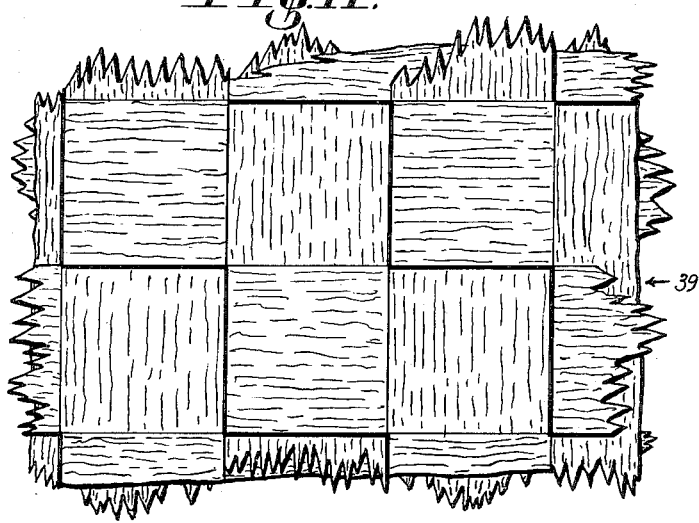
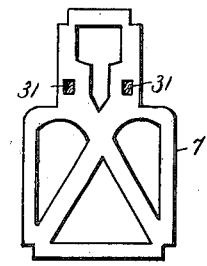
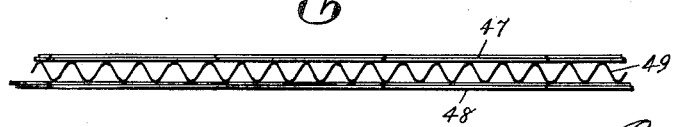
Osmond Theron Belcher
Inventor Patented Dec. 12, 1922.

1,438,686

UNITED STATES PATENT OFFICE.

OSMOND THERON BELCHER, OF LOS ANGELES, CALIFORNIA, ASSIGNOR TO BELCHER AERIAL MANUFACTURING COMPANY, A CORPORATION OF CALIFORNIA.

AEROPLANE CONSTRUCTION.

Application filed July 16, 1921. Serial No. 485,212.

*To all whom it may concern:*

Be it known that I, OSMOND THERON BELCHER, a citizen of the United States, residing at Los Angeles, in the county of Los Angeles and State of California, have invented new and useful Improvements in Aeroplane Constructions, of which the following is a specification.

My invention relates to improvements in aeroplane construction the objects being to use in such a structure a new, covering for the wings and fuselage and as an adequate support for the covering a novel cantilever structure for the wings and for the tail of the fuselage; to provide a wing covering that will present a rigid unbending surface to the air whereby an intended air foil of the wing will obtain and be the actual air foil while in flight, and to provide a cantilever wing construction which is self-supporting with a powerful factor of safety and requiring no outside bracing means.

With reference to the drawings:

Fig. 4 is a view showing in plan part of the frame work structure of the plane.

Fig. 5 is a view showing the plane in a front elevation.

Fig. 6 is a transverse sectional elevation of the plane taken on the line 6—6 Fig. 1, viewed from the front.

Fig. 7ᴬ is a view in side elevation of a section of a wing spar cord member.

Fig. 7ᴮ is a top view of the section of a cord member as shown in Fig. 7ᴬ.

Fig. 7ᶜ is an end view of the section of a cord member shown in Fig. 7ᴬ.

Fig. 8 is a transverse sectional view of a wing.

Figure 1:
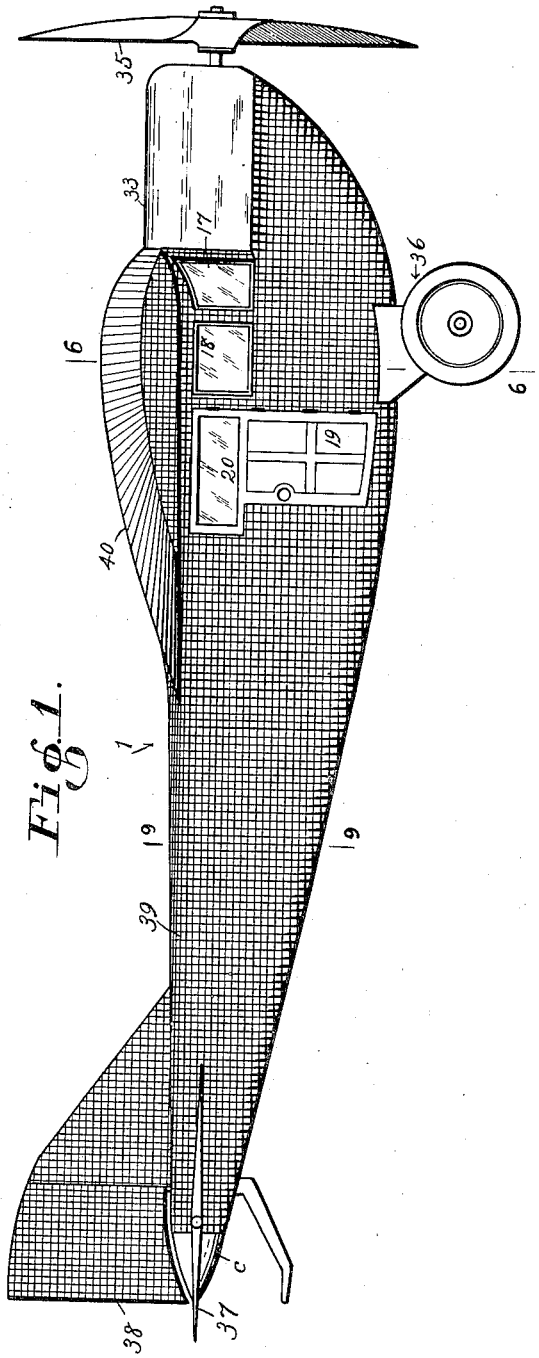
Fig. 1 is a view in side elevation of an aeroplane embodying the novel features of the present invention.

Fig. 9 is a transverse section of the fuselage taken on line 9, 9 Fig. 1.

Fig. 10 is a view in elevation of a diaphragm used as a supporting member in the fuselage.

Fig. 11 shows a fragment of a fabric used as the covering for wings and fuselage.

Fig. 12 is a view looking at the edge of the fabric shown in Fig. 11.

Fig. 13 shows, in perspective a section of corrugated filler used in the fabric shown in Figs. 11 and 12.

Fig. 14 is a view in elevation of a second diaphragm used to stiffen the fuselage transversely.

Fig. 15 is a view in elevation of a side panel used to stiffen the forward part of the fuselage longitudinally.

In the construction of the present invention a fuselage 1 is built up of two top longérons 2, 2 and two bottom longérons 3, 3. At the tail end of the fuselage a diaphragm 4 is placed between the four longérons and somewhat forward of the diaphragm 4 is a second diaphragm 5. Forward of the center of the fuselage is a third diaphragm 6 and near the front end is a fourth diaphragm 7. All the diaphragms corner on and support the four longérons and are formed of laminated sheets of wood, the larger ones being cut out as shown in Figs. 10 and 14.

Figure 2:
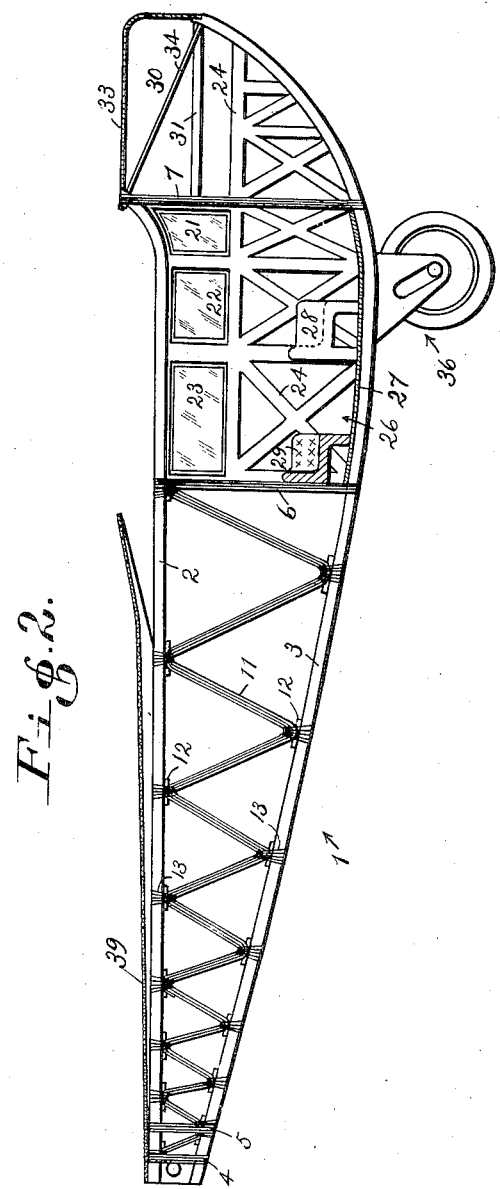
Fig. 2 is a longitudinal sectional elevation of the plane as shown in Fig. 1 with the wings removed and disclosing a frame work.

Between the two top longérons 2, 2 and extending from the diaphragm 6 back to the tail end is a continuous laminated zigzag brace 8. (See Fig. 4). The bends of the brace being seated with glue into seats 9 and wound with linen thread 10. On each side and extending from the diaphragm 6 backwardly continuous zigzag braces 11, 11 are placed between the two top longérons 2, 2 and the two bottom longérons 3, 3. The bends of the brace are glue seated in seats 12 and wound with thread 13. See Fig. 2. Between the two bottom longérons 3, 3 and extending from end to end is a continuous zig zag brace 14 seated at its bends in seats 15 and wound with thread 16. The bends of the four zig zag braces are intended to meet at the same points where they connect with any of the four longérons.

The aeroplane is an enclosed type as shown in Fig. 1 and on one side is formed a curved forward window 17, a side window 18 and a door 19 having a window 20 and on the opposite side is a forward window 21 and two side windows 22 and 23. Extending forwardly from the diaphragm 6 are two side panels 24 and 25. See Figs. 2, 6 and 15. The panels are formed of laminated sheets of wood cut out as shown and extend up around the windows and the door and from the top longérons to the bottom longérons, being securely fixed to the longérons.

Between the diaphragms 6 and 7 is a passenger and aviator compartment 26 having a flooring 27 and seats 28 and 29. Forward of the diaphragm 7 is an engine compartment 30 having engine sills 31, 31 carried by the diaphragm 7 and the front ends of the longérons 3, 3. The engine compartment is provided with a removable metal hood 33. The front ends of the longérons 3, 3 are supported by brace rods 34, 34 extending from the front ends of the longérons 2, 2.

Figure 3:
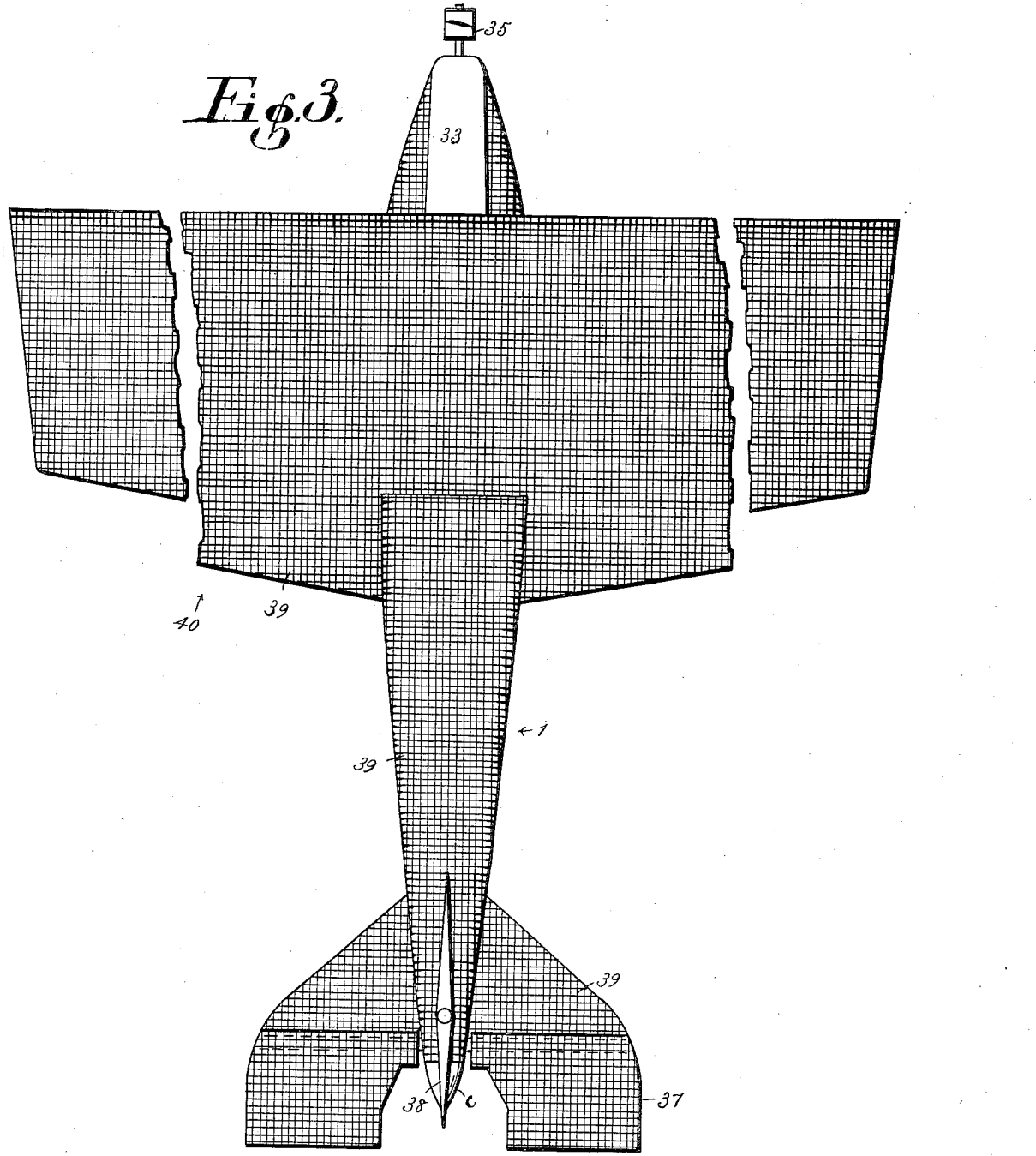
Fig. 3 is a top view of the plane having a section broken from the wings.

It is intended that an engine shall be mounted on the sills 31, 31 adapted to operate a propeller 35 as shown in Figs. 1, 3 and 5. A chassis 36 is positioned under the forward part of the fuselage. At the rear end of the fuselage is an elevator 37 the operating mechanism for which may be mounted upon the diaphragm 4, and a rudder 38, the operating mechanism for which may be carried by the diaphragm 5.

Except for the engine hood the entire fuselage together with the elevators and rudder is covered with a wood fabric 39, shown in Figs. 11, 12 and 13, and as indicated in Figs. 1 and 3.

The wings 40 for the plane are built up of a plurality of top cord members 41 extending from tip to tip of the wings and having double faced brace seats 42, and a plurality of bottom cord members 43 extending from tip to tip of the wings and having double faced brace seats 44, the bottom cord members being placed vertically midway between the top cord members.

Continuous laminated zig-zag wood brace elements 45 are placed between the top and bottom cord members with their bends glue seated in the seats 41 and 43, the bends being also bound to the cord members with linen thread 46. The brace elements extend between the cord members slantingly, there being two brace elements connecting to each cord member having their bends seating at the same point. See Fig. 8. The cord members and continuous brace elements are made tapering from their base or fuselage center to tip.

The wings are covered with the wood fabric as shown in Figs. 11, 12 and 13, and are securely yoked to the longérons 2, 2, there being a yoke 46 for each lower cord member. See Fig. 6.

Strength and rigidity in the wing is secured in the plurality of cantilever spars and also in the wood fabric used for the covering. In the fuselage the tail is made rigid by the continuous zig zag brace elements on the four sides between the four longérons and also by the wood fabric with which the fuselage is covered. In the forward part of the fuselage the sides are braced by the panels and covering, the bottom and breast by a zig zag brace and the covering and the top side by the wing structure. Also in the forward part of the fuselage are the two transverse diaphragms.

The continuous laminated zig-zag wood brace elements are formed of long thin wood strips steamed and bent with as sharp bends as can be made without breaking the fiber of the wood and with substantially straight intermediate sections between the bends. A second strip of wood is then glued against the first and so on until a laminated brace is built up of proper strength. A further detail of the continuous brace element and cantilever wing spar may be had by referring to my patent application, Ser. No. 454,269, filed March 21, 1921, entitled, "Internal brace construction for aeroplanes."

The covering used for the wings and fuselage is made on a special loom using ribbons of wood substantially fifteen-thousandths of an inch thick for the warp and weft of a simple weave. In the loom the weave is glued where the warp and weft overlay with water-proof glue. A sheet of such fabric is covered with wood ribbons formed corrugated as shown in Fig. 13 and a second sheet of the fabric is then laid over the corrugated filler, waterproof glue being used in the operation. Such a covering has long life and presents an unbending surface between widely separated supporting members whereby a more ideal air foil may be maintained than with a linen covering. A more complete detail of the covering may be had by reference to patent issued to me July 29, 1919, for "Aeroplane construction," Patent No. 1,311,205.

In the present application no ailerons have been shown on the wings nor control means for them and no control means has been shown for the elevators or the rudder as they form no part of the present invention. A removable cap C is placed on the tail end of the fuselage and made removable so that the mechanism of the elevators may be inspected.

The shock of landing delivered to the plane through the chassis is resisted by the bottom longérons which are supported by the side panels, the forward diaphragm and the coverings.

It is to be understood that the dimensions and the disposition of the several elements of the present invention relative to one another may be altered over that shown and that various other changes may be made in the invention without departing from the spirit thereof as claimed.

I claim:

1. In an aeroplane construction a fuselage framework, comprising a set of longérons, brace seats formed upon the longé- rons and properly spaced apart, continuous laminated zig-zag wood brace elements disposed between and securely fixed at their bends to the longérons within said brace seats, a covering for the framework, and wings mounted upon the fuselage.

2. In an aeroplane construction a fuselage framework comprising a set of longérons, continuous laminated zig-zag wood brace elements disposed between and securely fixed at their bends to the longérons; a covering for the fuselage composed of a sheet of simple weave of wood ribbons glued in the lap of warp and weft and a second sheet of like material spaced and fixed to the first by means of a corrugated filler of wood ribbons glued between, and wings mounted upon the fuselage.

3. In an aeroplane construction a fuselage framework comprising a set of longérons, brace seats formed upon the longérons and properly spaced apart, continuous laminated zig-zag wood brace elements disposed between and having their bends seated upon the longérons within said brace seats, laminated diaphragms mounted transversely between the longérons and positively secured thereto, a covering for the framework and wings mounted upon the fuselage.

4. In an aeroplane construction a fuselage framework comprising a set of longérons, continuous laminated zig-zag wood brace elements disposed between and having their bends seated against the longérons, laminated wood diaphragms mounted transversely between the longérons and positively fixed thereto, a covering for the fuselage composed of a sheet of simple weave of wood ribbons glued in the lap of warp and weft and a scond sheet of like material laid over the first and having a corrugated filler of wood ribbons glued between and wings mounted upon the fuselage.

5. In an aeroplane construction a fuselage framework comprising a set of four longérons, transverse laminated wood diaphragms adapted to space and support the longérons, there being a diaphragm positioned near the forward edge of a wing position and a second diaphragm near the rear edge of a wing position, continuous laminated zig-zag wood brace elements disposed between the two top longérons and, on the sides, between the two top and the two bottom longérons and from the said rear diaphragm rearwardly and between the two bottom longérons from end to end thereof, laminated wood panels disposed on the sides and secured to the top and bottom longérons from the second mentioned diaphragm forwardly and adapted to support and stiffen the framework, a covering for the framework and wings mounted upon the fuselage.

6. In an aeroplane construction a fuselage framework comprising four longérons, transverse laminated wood diaphragms adapted to spread and support the longérons, there being one positioned at the forward edge of a wing position and a second one positioned at the rear edge of a wing position, continuous laminated zig zag wood brace elements disposed between the two top longérons and on the sides between the two top longérons and the two bottom longérons, all of which brace elements extend from the second mentioned diaphragm rearwardly, and from end to end between the two bottom longérons, the said brace elements having their bends seated upon the longérons, laminated wood panels disposed on the side forwardly of the second mentioned diaphragm and secured to the two top and the two bottom longérons and adapted to support and stiffen the framework, a covering for the fuselage composed of a sheet of a simple weave of wood ribbons glued in the lap of warp and weft and a second sheet of like material laid over the first and secured thereto with a corrugation of wood ribbons glued between and wings mounted upon the fuselage.

7. In an aeroplane construction a fuselage framework comprising four longérons, transverse laminated wood diaphragms adapted to spread and support the longérons, there being a diaphragm substantially at the forward edge of a wing position and a second diaphragm substantially at the rear edge of a wing position, continuous laminated zig-zag wood brace elements, disposed between the two top longérons and on the sides between the two top and the two bottom longérons, said brace elements extending from the second mentioned diaphragm rearwardly, and between the two bottom longérons and extending from end to end thereof, the said brace elements having their bends firmly seated upon the longérons, laminated wood panels disposed on the sides forwardly of the second mentioned diaphragm and secured to the two top longérons and to the two bottom longérons and adapted to support and stiffen the framework, a covering for the fuselage composed of a sheet of simple weave of wood ribbons glued in the lap of warp and weft and a second sheet of like material laid over the first and secured thereto with a corrugation of wood ribbons glued between, and a pair of cantilever wings mounted across the top of the fuselage and secured to the top longérons at the aforesaid wing position comprising a framework of cantilever spars composed of top and bottom cord members, the bottom cord members being positioned vertically between the top cord members, and continuous laminated zig-zag wood brace elements disposed between and firmly fixed at their bends to the cord members, there being two brace elements extending slantingly from each cord member, and a covering for the wings substantially like the aforesaid covering for the fuselage.

8. In an aeroplane construction a fuselage framework comprising a set of longérons, continuous laminated zig-zag wood brace elements disposed between and having their bends firmly seated upon the longérons, a cover for the fuselage composed of a sheet of a simple weave of wood ribbons glued in the lap of warp and weft, and a second sheet of like material laid over the first and spaced therefrom by a filler of corrugated wood ribbons glued between, a pair of wings mounted across the top of the fuselage and yoked to the longérons, comprising a plurality of cantilever wing spars composed of top and bottom cord members and continuous laminated zig-zag wood brace elements disposed between and with their bends firmly seated upon the cord members and a covering for the wings composed substantially like the aforesaid covering for the fuselage.

9. In an aeroplane construction a fuselage framework, a covering for the framework composed of a double sheet of a simple weave of wood ribbons glued in the lap of warp and weft and spaced by a corrugation of wood ribbons glued between, wings mounted upon the fuselage comprising a plurality of cantilever wing spars having top and bottom cord members and having continuous laminated zig-zag wood brace elements disposed between the cord members with their bends firmly seated thereupon and a wing covering substantially like the covering of the fuselage.

10. In an aeroplane construction a fuselage, a wing frame-work mounted upon the fuselage comprising a plurality of cantilever spars having top and bottom cord members and having continuous laminated zig-zag wood brace elements disposed between the cord members, the bends of the brace elements being seated upon the cord members and a covering for the wing framework composed of two sheets of a simple weave of wood ribbons having a corrugation of wood ribbons glued between.

11. In an aeroplane construction, a fuselage, a wing frame-work mounted upon the fuselage comprising a plurality of cantilever spars having top and bottom cord members, brace seats formed upon the cord members and continuous laminated zig-zag wood brace elements disposed between the cord members, the bends of the brace elements being seated in the aforesaid brace seats and a covering for the wing frame-work composed of two sheets of a simple weave of wood ribbons having a corrugation of wood ribbons glued between.

12. In an aeroplane construction, a fuselage frame-work comprising a set of longérons, brace seats formed upon the longérons and spaced apart, continuous laminated zig-zag wood brace elements disposed between the longérons and securely fixed thereto with their bends seated in the brace seats, a covering for the fuselage composed of a sheet of a simple weave of wood ribbons glued in the lap of warp and weft and a second sheet of like material spaced from and fixed to the first by a corrugated filler of wood ribbons glued between, and wings mounted upon the fuselage.

13. In an aeroplane construction, a fuselage frame-work comprising a set of longérons, continuous laminated zig-zag wood brace elements disposed between and having their bends firmly seated upon the longérons, a cover for the fuselage composed of a sheet of simple weave of wood ribbons glued in the lap of warp and weft and a second sheet of like material laid upon the first and spaced therefrom by a filler of corrugated wood ribbons glued between, cantilever wing frames mounted upon said fuselage and a covering for the wing frames composed substantially like the covering of the fuselage.

14. In an aeroplane construction, a fuselage frame-work, a covering for the framework composed of two facing sheets of a simple weave of wood ribbons glued in the lap of warp and weft the facing sheets being spaced by a corrugation of wood ribbons glued between. cantilever wing frames mounted upon the fuselage and a covering for the wing frames substantially like the covering of the fuselage.

In testimony whereof, I have signed my name to this specification.

OSMOND THERON BELCHER.